Oct. 4, 1938.    M. PREISWERK    2,132,319
VIBRATION DAMPER
Filed March 4, 1936    2 Sheets-Sheet 1
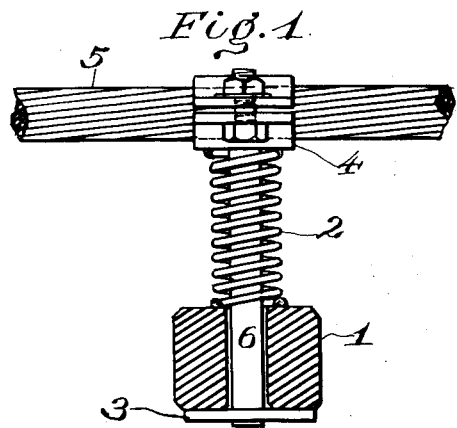
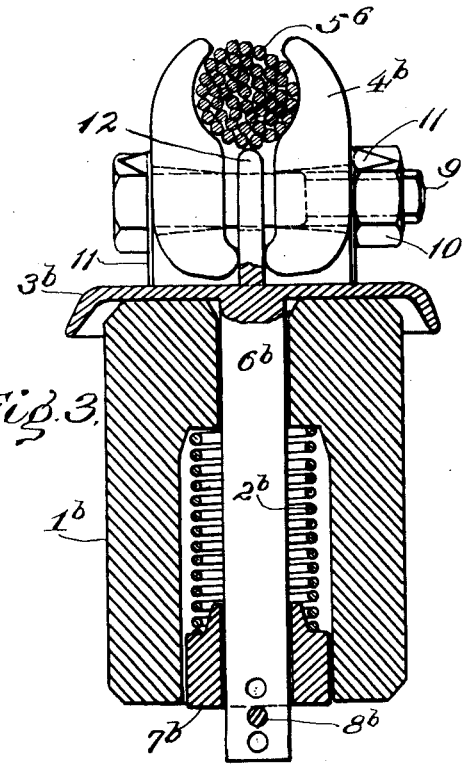
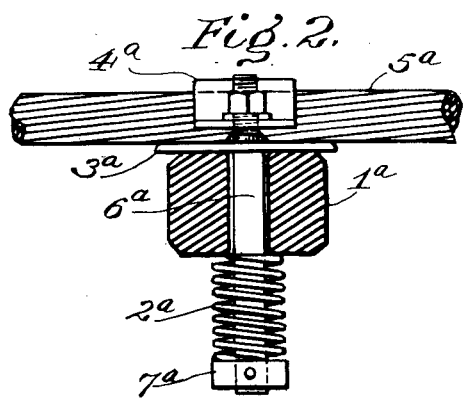
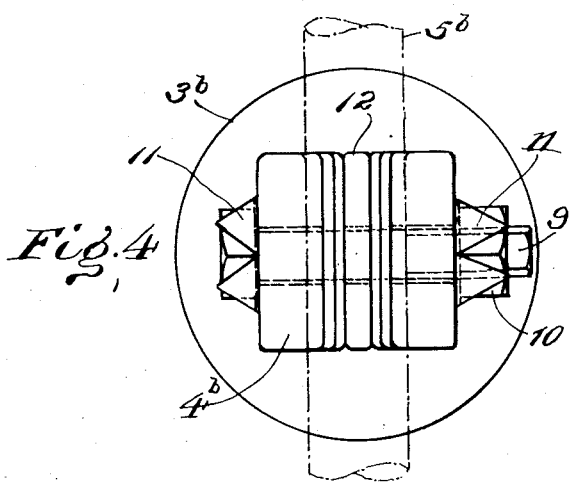
INVENTOR:
Max Preiswerk
BY Morrison, Kennedy & Campbell
ATTORNEYS.

Oct. 4, 1938.  M. PREISWERK  2,132,319
VIBRATION DAMPER
Filed March 4, 1936  2 Sheets-Sheet 2
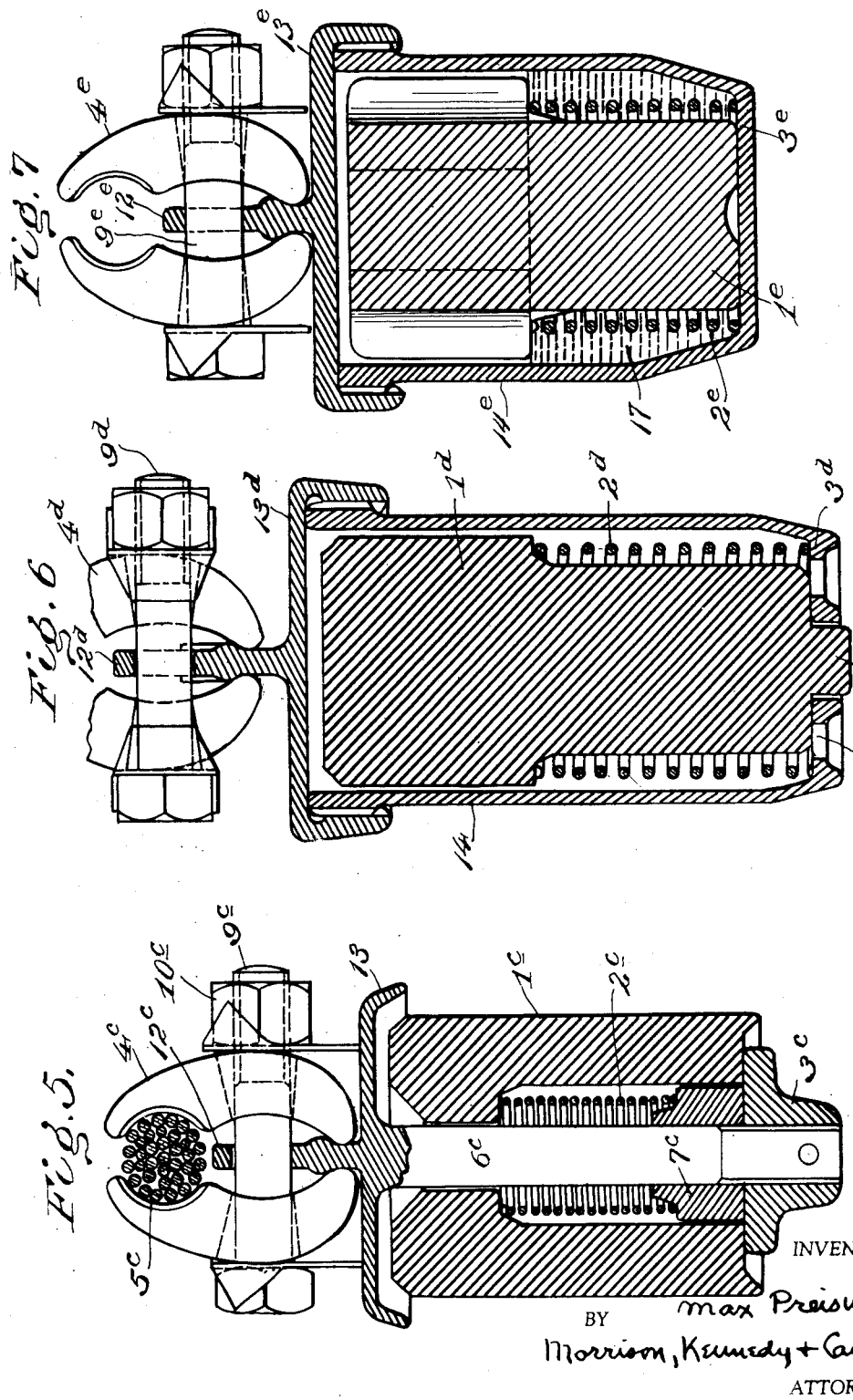
INVENTOR:
Max Preiswerk
BY Morrison, Kennedy + Campbell
ATTORNEYS.

Patented Oct. 4, 1938

2,132,319

UNITED STATES PATENT OFFICE 2,132,319

VIBRATION DAMPER

Max Preiswerk, Neuhausen, Switzerland, assignor to Aluminum-Industrie-Aktien-Gesellschaft, Neuhausen, Switzerland, a joint-stock company of Switzerland

Application March 4, 1936, Serial No. 67,026
In Switzerland March 6, 1935

11 Claims. (Cl. 173—13)

This invention relates to the damping of vibrations of aerial lines, such as overhead wires, cables, tubes and the like, stretched between poles, fulcrums or other supports, for electrical transmission or other uses, the invention including the method and device or means herein disclosed. Such lines, exposed to air movements, especially strong steady winds, assume substantial vibrations, as in vertical or up and down manner, for example at frequencies between six and sixty per second, in line lengths of one to ten meters between nodes of vibration. This action is detrimental and endangers the lines themselves, the line supporting clamps or insulators and even the supports in some cases.

The main object of the invention is to damp efficiently or to minimize such line vibrations and the harm thereby caused. Especially it is a purpose to suppress vibration in an immediate or relatively quick manner and reliably. A particular object is to afford a portable damping device which may be readily and securely attached to an aerial line at a selected point or points between poles, and another object is simplicity of device with inexpensiveness of structure.

Further objects and advantages will appear in the following description of several illustrative embodiments of the invention.

The basic principle of damping action is to transform the vibratory action or motion into another form of energy, namely heat, through friction and impact, the heat being dissipated by the same air currents that tend to cause the vibration. Acting promptly the device to be described prevents the starting of vibrations of objectionable energy or extent, and one or any desired number may be applied on each stretch of line, between poles, as one between each two adjacent nodes of vibration. These principles are followed by the structure and action of each of the forms of device to be described.

Fig. 1 is a side elevation view of a vibration damper or device embodying the invention, the same attached to a line or cable, and with its weight shown in central vertical section.

Fig. 2 is a similar side elevation view of a second embodiment or structure.

Fig. 3 is an end elevation of a third embodiment, with the weight and certain other parts in central section; and Fig. 4 is a top view of the device with the cable indicated only in dotted lines.

Fig. 5 is an end elevation view of a fourth embodiment, in modification of the third with the weight and certain other parts in central section.

Fig. 6 is an end elevation in section of a fifth embodiment having an enclosing shell or casing, with the weight and adjacent parts shown in central section.

Fig. 7 in similar view shows a sixth embodiment, a simplification of the Fig. 6 form.

Innumerable other forms and types of embodiment may be devised on the same principles, the six disclosed forms being merely illustrative of the variations possible.

The frequency of vibrations, such as those here involved is determined by the formula $$f = \frac{K}{L}\sqrt{\frac{T}{W}}$$

wherein $f$ represents the frequency, and $K$ is a constant, and $L$ represents the nodal distance or one half the full wave length of the vibration of the cable line between fulcrums, and $T$ represents the strain or tension in the cable, and $W$ represents the weight of the cable per lineal unit. From this formula it is seen that the frequency of vibration is a function of the cable strain and of the distance between nodes and of the lineal mass of the conductor.

The action on which the invention is based is to hinder the formation of vibrations of constant frequency at the same distance between the nodes by changing constantly the effective mass of the vibrating body, or the stresses causing the vibrations. As it follows from the above formula, the frequency of vibration should change when the mass of the body in movement changes, but this is practically impossible. When the mass of the body is effectively changed, any resonance in the overhead transmission line is prevented; the objectionable vibrations thus become damped while they are still in the state of formation, and so a built-up amplitude and resonance are suppressed.

To realize this method of damping masses of substantial weight are used. Each weight is connected resiliently, by means of springs or the like, with the line that is exposed to vibrations. Such weight and spring device is provided also with means to transform the motion-energy to heat-energy, as by friction or impact; for example one or more stops or abutments are mounted in fixed relation to the line or cable; these stops operating to start the movement of the damping weights in one direction of vibration as soon as vibrations commence.

When vibrations occur in a cable which is provided in this manner with damping weights, then in one direction of movement, as up or down, the mass of the cable with the added mass of the damping weights must be moved by the initial force or wind; the weights being thrust along by the stop pieces. In the other direction of movement, at least at first, the cable alone is moved, while the damping weights, resiliently fixed to the cable, following only with an appreciable lag or delay. Therefore the effective mass of the cable in movement changes constantly, as before stated. The spring is under varying degrees of strain as well, and operates to transmit damping variations of stress to the cable.

Each weight is supported chiefly or wholly by its spring, as will be described, and therefore it is not necessary that the amplitude of the movement of the cable shall exceed the acceleration due to gravity in order to separate or lift the weight from the stop part.

The damping obtained by this method, is, according to practical demonstrations, so efficacious that overhead transmission lines, which are provided with the dampers according to the present invention, remain in a practical sense absolutely quiet, even under very unfavorable conditions.

The described damping effect becomes still more effective when, under specially unfavorable stresses, initial larger movements of vibration are originated in the cable, because the consumption of energy by friction and by shock between the damping weights and the other parts of the damping devices is added to the damping by the change of the mass in movement.

Referring now to the device shown in Fig. 1 the damping weight or mass 1 is connected to or suspended on a resilient member or spring 2, the other end of which is attached to the clamp 4. The clamp consists of opposite clamp parts, and closing means by means of which the entire damping device is applied and fastened to the cable 5. The clamp 4 carries a depending member, rod or hanger, in the form of a bolt 6 in fixed relation to the clamp and cable. The clamp and hanger may be considered to be the frame or body of the device, with relation to which the mass and spring move. This frame, or the hanger 6 carries a stop or limiting member 3, contacted at times by the weight. The spring, representative of any suitable resilient device, is chosen of such strength that the weight 1, when the cable is not being moved, is suspended close to the stop or disk 3 or even bears upon the stop. If the weight 1 is desired to strain the spring and touch the stop 3 when the cable is not moved, the tension of the spring 2 may be selected so that the spring supports the major part, say nine tenths of the weight 1, the disk supporting one tenth. In this case it is sufficient, when the cable moves, that the downward speed exceeds 10% of the acceleration due to gravity, in order to lift off the weight 1 from the stop disk 3.

When the cable 5 begins to vibrate, the weight 1 is carried along by the stop disk 3 in each upward movement, increasing the weight of the line. In the downward movement, on the contrary, the lightly supported weight lags behind, while the spring becomes strained or compressed. Therefore in this return vibration the effective mass of the cable 5 becomes diminished by the mass of the weight 1; the energy consumed by the spring 2 can be practically neglected.

The separable clamp, by bolt or other attachment is readily attachable to any point in the line, and may be shifted along when necessary.

The longitudinal member or depending hanger 6 is held by the clamp and affords a guide or frame for the weight in its movements relatively to the clamp and cable, as well as carrying the stop 3 in opposition to the gravity of the mass, or the difference between its gravity and the stress of the spring.

In the damper according to Fig. 2 the weight $1^a$ rests upon the spring $2^a$, which is supported by the bolt $6^a$ or its collar $7^a$, and the stress of which may slightly exceed the weight. When vibrations occur the weight is carried along down by the stop disk $3^a$ in the downward movement, and it remains behind in the upward movement. The hanger $6^a$ is attached by clamp $4^a$ to the cable $5^a$.

In Figs. 1 and 2 the return movement causes the weight to impact against the stop, with damping effect and dissipation of vibratory energy. These forms illustrate the spring under strain of tension and compression respectively.

The damper according to Figs. 3 and 4 has certain advantages. The weight $1^b$ is hollow, having the shape of a bell, so that it encloses the spring $2^b$ and protects it against the effects of the weather. The stop disk $3^b$ has the shape of an inverted dish, its rim preventing the penetration of dirt, snow or rain. The stress or compression of the spring is regulated by means of the adjusting collar or piece $7^b$, which is supported by a pin $8^b$ inserted into the bolt $6^b$. It is also possible to adjust the piece $7^b$ by means of a screw thread on the bolt $6^b$. The entire hanger $3^b$, $6^b$, $7^b$ is suspended by an eye 12 above the disk $3^b$ through which eye extends a screw bolt 9. This bolt 9 is provided with a nut 10 and with locking plates 11 for the bolt head and nut, and the bolt holds the clamp parts $4^b$ together on the cable $5^b$.

The clamp $4^b$ has its parts pressed sideways against the cable. This disposition of the clamps is very suitable, as the line or cable, when vibrations occur, is exposed to stretching and compression stresses at most with its top and bottom sides or wires. As the clamps are pressed sideways, there arise no supplementary stresses or wear on the most sensitive parts of the cable. Furthermore the clamps can be separated in such a way that it is possible to fasten the damper onto the cable without detaching completely the attaching nuts as with Figs. 1 and 2, and without the necessity of dividing the clamp in several pieces. The clamp parts, in any case, are preferably made of the same metal as the cable or of an analogous material. For copper cables preferably copper clamps are used, for aluminum or aluminum alloy cables aluminum or aluminum alloy clamps, etc.

In the first, second and third embodiments described the weight is stopped in one direction only, the spring opposing movement in the opposite direction. In some cases it is suitable to limit the shift of the weight by a stop part in each direction, with a substantial clearance or distance of play between them, the spring normally holding the weight to one stop and the weight alternately impacting both stops.

Thus, Fig. 5 shows an example of a damper provided with two stop parts $3^c$ and 13. When the cable $5^c$ is not in movement, the weight $1^c$ rests partly on the spring $2^c$ and with a small fraction (for instance 10%) of its weight on the stop part $3^c$, the latter carrying the weight along up when the cable is moving upwards. The shift of the weight $1^c$ is limited in the upward direction by the cover 13, which acts as the second stop part. The stop part 3ᶜ is fixed on the hanger bar 6ᶜ. The entire device is fastened onto the cable 5ᶜ by means of the clamp 4ᶜ. The weight 7ᶜ, bolt 9ᶜ, nut 10ᶜ and eye 12ᶜ may be like the corresponding parts in Fig. 3.

The Fig. 6 embodiment will next be referred to. It was found that under very severe conditions, for instance during thunderstorms, water or snow can penetrate to the spring even when the spring is enclosed by the bell-like weight as in Fig. 3 or 5. Without regard to the fact that during very cold weather freezing of penetrated water can occur, whereby the vibration dampers might be inoperative, steel springs that are not made of corrosion resistant material could be impaired by rust or the like and progressively rendered useless. Even protective coatings, for instance of zinc, have not been found quite reliable. These drawbacks can be avoided by surrounding the weight and the spring with an exterior enclosing casing or shell, which protects effectively the weight and the spring against water or moisture. This protective casing is in no wise prejudiciable to the damping device.

Fig. 6 shows such a structure. The applying of the casing or shell 14 permits dispensing with the bar or bolt 6, which supports the weight and the spring, as it is shown in Fig. 3 or 5. The casing now becomes the frame or hanger of the device. The spring 2ᵈ can be fastened onto the cover 13ᵈ or, more simply, rest on the interior bottom of the protective casing 14. If desired, the casing can be filled with an oil or another suitable anticorrosive liquid, preferably one which does not freeze at any temperature to which the cable is subjected in practice.

In Fig. 6 the weight 1ᵈ and the spring 2ᵈ are surrounded by the protective casing 14, which is screwed onto the cover 13ᵈ. The spring 2ᵈ rests on the bottom of the casing 14 and supports for instance 90% of the weight 1ᵈ, the rest of the weight being supported by the bottom 3ᵈ of the casing, which acts as stop part and carries the weight 1ᵈ along in the upward movement of the cable. The cover 13ᵈ limits the shift of the weight 1ᵈ in the upward direction, that is to say, when the cable clamp 4ᵃ moves downwards and when the movement is great and quick enough to lift relatively the weight up to this cover. The bottom of the casing 14 is provided with drain holes 15, so that condensation or other water possibly present may run out. The weight 1ᵈ has an extension or pin 16 which occupies and can play in the middle hole of the bottom of the casing 14, this arrangement acting as a guide for the weight movements. The eye 12ᵈ and bolt 9ᵈ may be like those parts in Fig. 5.

Fig. 7 shows a simple damper device the casing 14ᵉ of which is filled up to about half its height with oil 17, protecting the spring 2ᵉ and weight 1ᵉ. The flanged top 13ᵉ is connected to the cable clamp 4ᵉ as in Fig. 6. The bottom 3ᵉ is the lower stop. The hanger 14ᵉ is suspended by eye 12ᵉ from the clamp.

I claim:

1. A device for damping vibrations of lines etc. characterized by a damping weight movable toward and away from the line, a spring resisting the movement of the weight in one direction, and a stop means limiting the movement of the weight in the other direction, said stop means being so positioned that the weight is substantially in contact with it when at rest.

2. A device for damping vibrations of lines etc. characterized by an exteriorly depending hanger, a damping weight movable on said hanger toward and away from the line, a stop on said hanger arranged to be engaged by the weight to limit its movement in one direction during damping operations, and a spring under stress connected with the weight to control the movement of the weight when out of engagement with said stop; the gravity of the weight being such in relation to the strength of the spring that the weight in its normal position of rest is in contact with the stop.

3. A device for damping vibrations of lines etc. characterized by an exteriorly depending hanger, a damping weight movable on said hanger toward and away from the line, a stop in fixed position on said hanger arranged to be engaged by the weight to limit its movement in one direction during damping operations, and a helical spring under stress mounted on the hanger and connected with the weight to control the movements of the weight when out of engagement with said stop; the weight being such that when at rest it lightly contacts the stop.

4. A device for damping vibrations of lines etc. characterized by an exteriorly depending hanger, a damping weight movable on said hanger toward and away from the line, a stop means on said hanger arranged to be engaged by the weight to limit its movement in one direction during damping operations, and a spring under stress connected with the weight to control the movement of the weight when out of engagement with said stop means; the spring being of such resilience in relation to the position of the stop that the weight, as controlled by the spring and its own gravity, when the device is idle and the weight is at rest, remains substantially in engagement with the stop means.

5. A device for damping vibrations of lines etc. characterized by an exteriorly depending hanger, a damping weight movable on said hanger toward and away from the line, a stop means on said hanger arranged to be engaged by the weight to limit its movement in one direction during damping operations, a spring under stress connected with the weight to control the movements of the weight during damping operations; and a second stop means on the hanger limiting the motion of the weight in the direction opposite that of the first stop means, the spring operating to leave the weight in substantial contact with the first stop means when at rest and when active to control the play of the weight on the hanger between the two stops.

6. A device for damping vibrations of lines etc. characterized by an exteriorly depending hanger, a damping weight movable on said hanger toward and away from the line, a stop means on said hanger arranged to be engaged by the weight to limit its movement in one direction during damping operations, and a spring under stress connected with the weight to control the movement of the weight when out of engagement with said stop means; the weight being hollow and surrounding the spring, and the stop being in the shape of an overlying plate with downwardly flanged rim to exclude the penetration of rain and dirt.

7. A device for damping vibrations of lines etc. characterized by an exteriorly depending hanger, a damping weight movable on said hanger toward and away from the line, a stop on said hanger arranged below the weight to be engaged by the weight to limit its downward movement during damping operations, and a spring under tension from which the weight hangs whereby the spring controls the movement of the weight when out of engagement with said stop; the weight being of such gravity as to tension the spring sufficiently for the weight to rest in contact upon the stop when idle.

8. A device for damping vibrations of lines etc. characterized by an exteriorly depending hanger, a damping weight movable on said hanger toward and away from the line, a stop on said hanger arranged to be engaged by the weight to limit its movement in one direction during damping operations, and a spring under compression connected with the weight to control the movement of the weight when out of engagement with said stop; the weight being above and resting upon and by its gravity compressing the spring, and the stop being located above, and adapted to stop each ascent of, the weight, and the weight being of such gravity in relation to the resilience of the spring that the weight is held up in normal contact with the stop when at rest.

9. A device for damping vibrations of lines etc. characterized by an exteriorly depending hanger, a damping weight movable on said hanger toward and away from the line, a stop on said hanger arranged to be engaged by the weight to limit its movement in one direction during damping operations, and a spring under stress connected with the weight to control the movement of the weight when out of engagement with said stop; the arrangement being such that the spring assumes the greater part of the gravity of the weight, and the stop assumes the remainder thereof.

10. A device for damping vibrations of an aerial line between supports, comprising a hanger having a clamp member attachable to the line and a depending extension member, a damping weight of substantial mass and inertia movable upon said depending member toward and from the line, and a resilient element connected at one end to said hanger and at its other end to said weight, said resilient element being under normal initial strain by the gravity of the weight; whereby when the line vibrates vertically relative movements occur between line and weight with resulting damping effects upon the line; and a positive stop positioned substantially at the normal resting position of the weight to limit its movement in one direction therefrom.

11. A device as in claim 10, wherein the resilient element is a spring, and the spring and stop are so related that when the device is idle the weight rests normally in contact with the stop by reason of the difference between the gravity of the weight and the stress of the spring; and the spring being such that when idle it acts upon the weight with a force differing fractionally from the gravity of the weight, and the stop normally resists such fractional difference of force.

MAX PREISWERK.